United States Patent
Kida

(10) Patent No.: US 8,976,175 B2
(45) Date of Patent: Mar. 10, 2015

(54) DEPTH ESTIMATION DATA GENERATING DEVICE, COMPUTER READABLE RECORDING MEDIUM HAVING DEPTH ESTIMATION DATA GENERATING PROGRAM RECORDED THEREON, AND PSEUDO-STEREO IMAGE DISPLAY DEVICE

(75) Inventor: Shingo Kida, Tokyo (JP)

(73) Assignee: JVC Kenwood Corporation, Yokohama-Shi, Kanagawa (JP)

( * ) Notice: Subject to any disclaimer, the term of this patent is extended or adjusted under 35 U.S.C. 154(b) by 271 days.

(21) Appl. No.: 13/356,084

(22) Filed: Jan. 23, 2012

(65) Prior Publication Data
US 2012/0188244 A1    Jul. 26, 2012

(30) Foreign Application Priority Data
Jan. 24, 2011    (JP) ................ P2011-011836

(51) Int. Cl.
G06T 15/50    (2011.01)
H04N 13/02    (2006.01)
G06T 15/00    (2011.01)

(52) U.S. Cl.
CPC .................. *H04N 13/026* (2013.01)
USPC ......................... 345/426; 345/419

(58) Field of Classification Search
CPC ............... G06T 15/506; G06T 15/50
USPC .......................... 345/326, 426, 419
See application file for complete search history.

(56) References Cited

U.S. PATENT DOCUMENTS

| 2003/0122845 | A1* | 7/2003 | Lee et al. ............... 345/589 |
| 2005/0031200 | A1 | 2/2005 | Lee et al. |
| 2008/0247670 | A1 | 10/2008 | Tam et al. |

(Continued)

FOREIGN PATENT DOCUMENTS

| JP | 9-185712 A | 7/1997 |
| JP | 2006-185033 A | 7/2006 |

OTHER PUBLICATIONS

R. Fisher, S. Perkins, A. Walker, and E. Wolfart, "Contrast Stretching", 2003, http://homepages.inf.ed.ac.uk/rbf/HIPR2/stretch.htm.*

(Continued)

*Primary Examiner* — Devona Faulk
*Assistant Examiner* — Jin Ge
(74) *Attorney, Agent, or Firm* — Nath, Goldberg & Meyer; Jerald L. Meyer; Tiffany A. Johnson

(57) ABSTRACT

A depth estimation data generating device includes a difference data generator and negative and positive shift amount generators. The difference data generator calculates the difference between a non-stereo image and the average value data of the average brightness of the non-stereo image to generate the difference data. The negative shift amount generator generates a negative shift amount, wherein the difference data generated using the minimum value data of the minimum brightness of the non-stereo image has a minimum value of shift amount and the shift amount approaches zero from the minimum value as the difference data approaches zero. The positive shift amount generator generates a positive shift amount, wherein the difference data generated using the maximum value data of the maximum brightness of the non-stereo image has a maximum value of shift amount and the shift amount approaches zero from the maximum value as the difference data approaches zero.

3 Claims, 9 Drawing Sheets

(56) References Cited

U.S. PATENT DOCUMENTS

2010/0315488 A1     12/2010  Kim et al.
2011/0080400 A1*     4/2011  Yamada .................... 345/419
2011/0090216 A1*     4/2011  Yamada et al. ............. 345/419

OTHER PUBLICATIONS

Search Report in Corresponding German Patent Application No. 102012000946.1. English Translation Attached.

* cited by examiner

FIG. 10
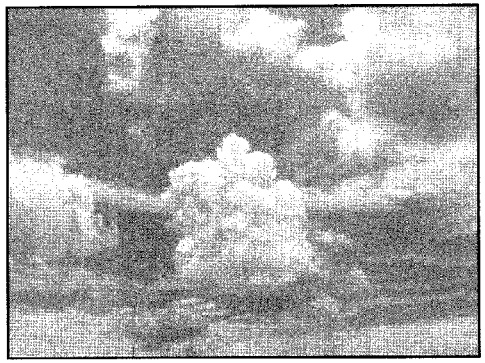
(a) INPUT IMAGE
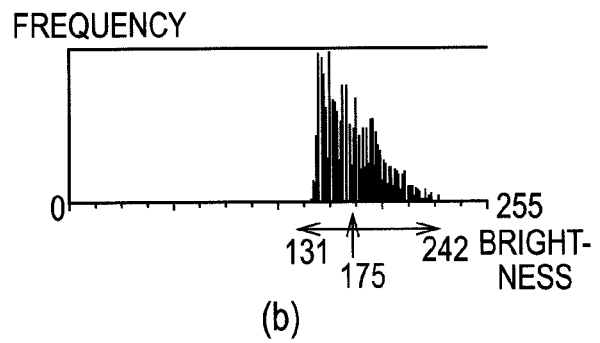
(b)
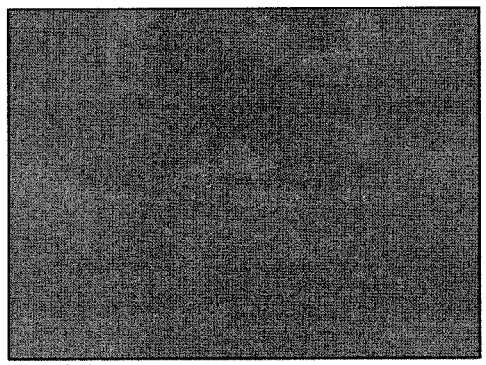
(c) CONVENTIONAL SHIFT AMOUNT IMAGE
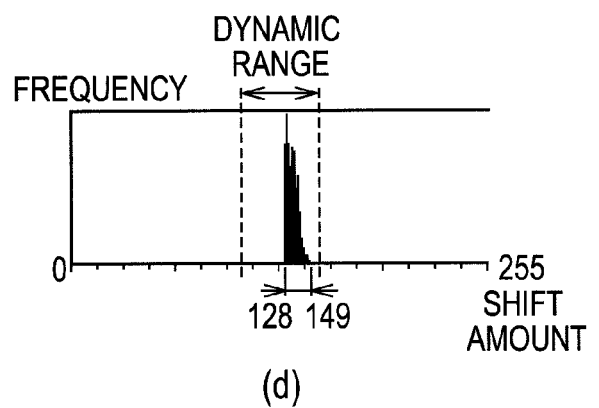
(d)
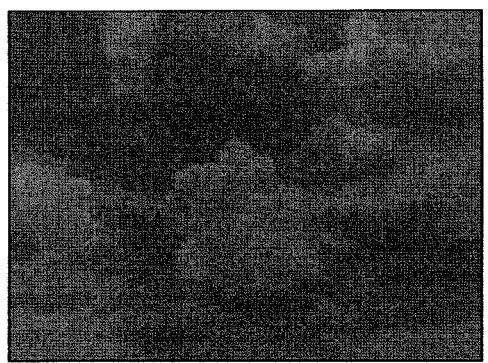
(e) SHIFT AMOUNT IMAGE OF PRESENT INVENTION
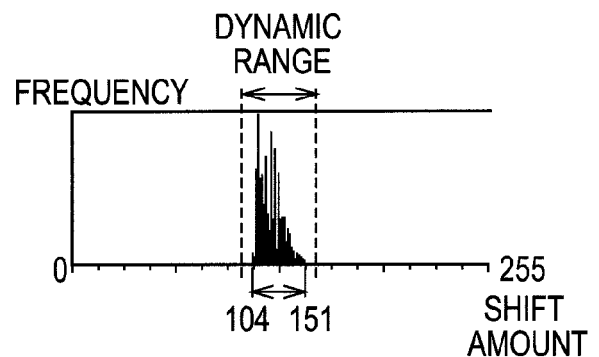
(f)
SHIFT AMOUNT
255 PROJECTING DIRECTION MAXIMUM PARALLAX
128 PARALLAX 0
0 WITHDRAWING DIRECTION MAXIMUM PARALLAX

DEPTH ESTIMATION DATA GENERATING DEVICE, COMPUTER READABLE RECORDING MEDIUM HAVING DEPTH ESTIMATION DATA GENERATING PROGRAM RECORDED THEREON, AND PSEUDO-STEREO IMAGE DISPLAY DEVICE

CROSS REFERENCE TO RELATED APPLICATION

This application claims benefit of priority under 35 U.S.C. §119 to Japanese Patent Application No. 2011-011836, filed on Jan. 24, 2011, the entire contents of which are incorporated by reference herein.

BACKGROUND OF THE INVENTION

1. Field of the Invention

The present invention relates to a depth estimation data generating device, a computer-readable recording medium having a depth estimation data generating program recorded thereon, and a pseudo-stereo image display device, and particularly to a depth estimation data generating device, a computer-readable recording medium having a depth estimation data generating program recorded thereon, and a pseudo-stereo image display device for generating pseudo-stereo images from normal still images or videos i.e., images which are not provided with depth information (non-stereo images) explicitly or even implicitly, as with stereo images.

2. Description of the Related Art

In order to enable viewing of non-stereo images by pseudo-stereo viewing, a stereo display system performs a process of generating pseudo-stereo images from normal still images or videos i.e., images which are not provided with depth information (non-stereo images) explicitly or even implicitly, as with stereo images.

As such a technical example, there is conventionally known a perspective-based approach such as a technique disclosed, for example, in patent document 1 (Japanese Patent Application Laid-Open Publication No. H09-185712) which presumes construction of a tube with contours as its cross sections in accordance with the depth.

The technique disclosed in patent document 1 adds distance information of contours to mesh image data to form 3-dimensional polygon solid data, and applies color image data obtained from photograph images to the 3-dimensional polygon solid data. Subsequently, the 3-dimensional polygon solid is rendered in a manner attaching color image data inside the 3-dimensional polygon solid constructed by the 3-dimensional polygon solid data so that 3-dimensional image data is obtained.

In addition, there is technique disclosed in patent document 2 (Japanese Patent Application Laid-Open Publication No. 2006-185033) as another conventional example. In order to determine a scene structure as close to reality as possible, the pseudo-stereo image generating device disclosed in patent document 2 determines synthesis ratio according to a high-pass component evaluation value from an upper high-pass component evaluation unit and a lower high-pass component evaluation unit using a plurality of basic depth models indicating depth values for each of a plurality of scene structures to be the basis, and synthesizes a plurality of basic depth models in accordance with the synthesis ratio. An adder then superimposes the synthesized basic depth model and R signals of a non-stereo image, generates the final depth estimation data, and performs a process on the basis of the depth estimation data on video signals of the non-stereo image to generate video signals of a different-viewpoint image which provides a stereoscopic effect.

However, the technique disclosed in patent document 1 is based on perspective and thus has a problem of limited effects because perspective structure estimation in practice does not necessarily fit all the scenes of various non-stereo images to be input. In addition, even if perspective structure estimation is suited, there has also been a problem that it is not easy to realize stereoscopic vision without a sense of strangeness by automatically constructing a correct depth structure model.

Furthermore, the technique disclosed in patent document 2 generates depth estimation data by synthesizing a plurality of basic depth models and superimposing R signals with the synthesized basic depth model. However, if the R signals to be superimposed are concentrated near a large value in a screen, the expected pseudo-stereo effect is not sufficient because only a part of the dynamic range available as the depth estimation data is being used.

For example, referring to FIG. 1, since the R signals are reduced to ⅒ and superimposed in patent document 2, input of the R signals is reduced to ⅒ in FIG. 1. Denoting the average, the maximum value, and the minimum value of the R signals as APL, MAX, and MIN, respectively, the range actually used by the R signals becomes significantly narrower than the dynamic range, as shown in an enlarged view illustrated at the lower part of FIG. 1. Therefore, only a part of the dynamic range is used, and thus a sufficient pseudo-stereo effect can not be obtained.

SUMMARY OF THE INVENTION

It is an object of the present invention, which has been proposed in view of the above circumstances, to provide a depth estimation data generating device, a computer-readable recording medium having a depth estimation data generating program recorded thereon, and a pseudo-stereo image display device which utilize the dynamic range to a maximum extent so that a sufficient pseudo-stereo effect can be obtained.

In order to achieve the object described above, the depth estimation data generating device according to the present invention includes: an average value detector which detects an average brightness of brightness signal components of an image and generates average value data; a minimum value detector which detects a minimum brightness of the brightness signal components of the image to generate minimum value data; a maximum value detector which detects a maximum brightness of the brightness signal components of the image to generate maximum value data; a difference data generator which calculates a difference between the brightness signal components of the image and the average value data to generate difference data; a negative shift amount generator which generates a negative shift amount, in which the difference data generated using the minimum value data has a minimum value of shift amount and the shift amount approaches zero from the minimum value as the difference data approaches zero; a positive shift amount generator which generates a positive shift amount, in which the difference data generated using the maximum value data has a maximum value of shift amount and the shift amount approaches zero from the maximum value as the difference data approaches zero; and a depth estimation data output unit which outputs the negative shift amount and the positive shift amount as depth estimation data for generating a pseudo-stereo image from the image.

Additionally, in the nontransitory physical computer-readable recording medium having the depth estimation data generating program according to the present invention recorded thereon, the depth estimation data generating program causes a computer to execute: an average value detecting step of detecting an average brightness of brightness signal components of an image to generate average value data; a minimum value detecting step of detecting a minimum brightness of the brightness signal components of the image to generate minimum value data; a maximum value detecting step of detecting a maximum brightness of the brightness signal components of the image to generate maximum value data; a difference data generating step of calculating a difference between the brightness signal components of the image and the average value data to generate difference data; a negative shift amount generating step of generating a negative shift amount, in which the difference data generated using the minimum value data has a minimum value of shift amount and the shift amount approaches zero from the minimum value as the difference data approaches zero; a positive shift amount generating step of generating a positive shift amount, in which the difference data generated using the maximum value data has a maximum value of shift amount and the shift amount approaches zero from the maximum value as the difference data approaches zero; and a depth estimation data output step of outputting the negative shift amount and the positive shift amount as depth estimation data for generating a pseudo-stereo image from the image.

Furthermore, the pseudo-stereo image display device according to the present invention, which is a pseudo-stereo image display device for generating and displaying a pseudo-stereo image from a non-stereo image which is not provided with depth information explicitly or even implicitly, as with a stereo image, includes: a depth estimation data generator which generates the depth estimation data; a stereo pair generating device which generates a different-viewpoint image for displaying a pseudo-stereo image by shifting the texture of the non-stereo image by an amount in accordance with the depth of the corresponding part using the depth estimation data and the non-stereo image; and a stereo display device which displays the pseudo-stereo image using the different-viewpoint image and the non-stereo image.

According to the depth estimation data generating device and the computer-readable recording medium having the depth estimation data generating program recorded thereon according to the present invention, the maximum value and the minimum value of a non-stereo image are compensated in association with the upper limit and the lower limit of the dynamic range based on the average brightness of the non-stereo image, and whereby the dynamic range is utilized to a maximum extent so that a sufficient pseudo-stereo effect can be obtained.

In addition, according to the pseudo-stereo image display device according to the present invention, the maximum value and the minimum value of a non-stereo image are compensated in association with the upper limit and the lower limit of the dynamic range based on the average brightness of the non-stereo image to generate and display a pseudo-stereo image using the compensated depth estimation data, and whereby the dynamic range is utilized to a maximum extent so that an image with a sufficient pseudo-stereo effect can be displayed.

BRIEF DESCRIPTION OF THE DRAWINGS

FIG. 10 is an explanatory view of an effect by the depth estimation data generating device according to the embodiment of the present invention.

DESCRIPTION OF THE EMBODIMENTS

Figure 1:
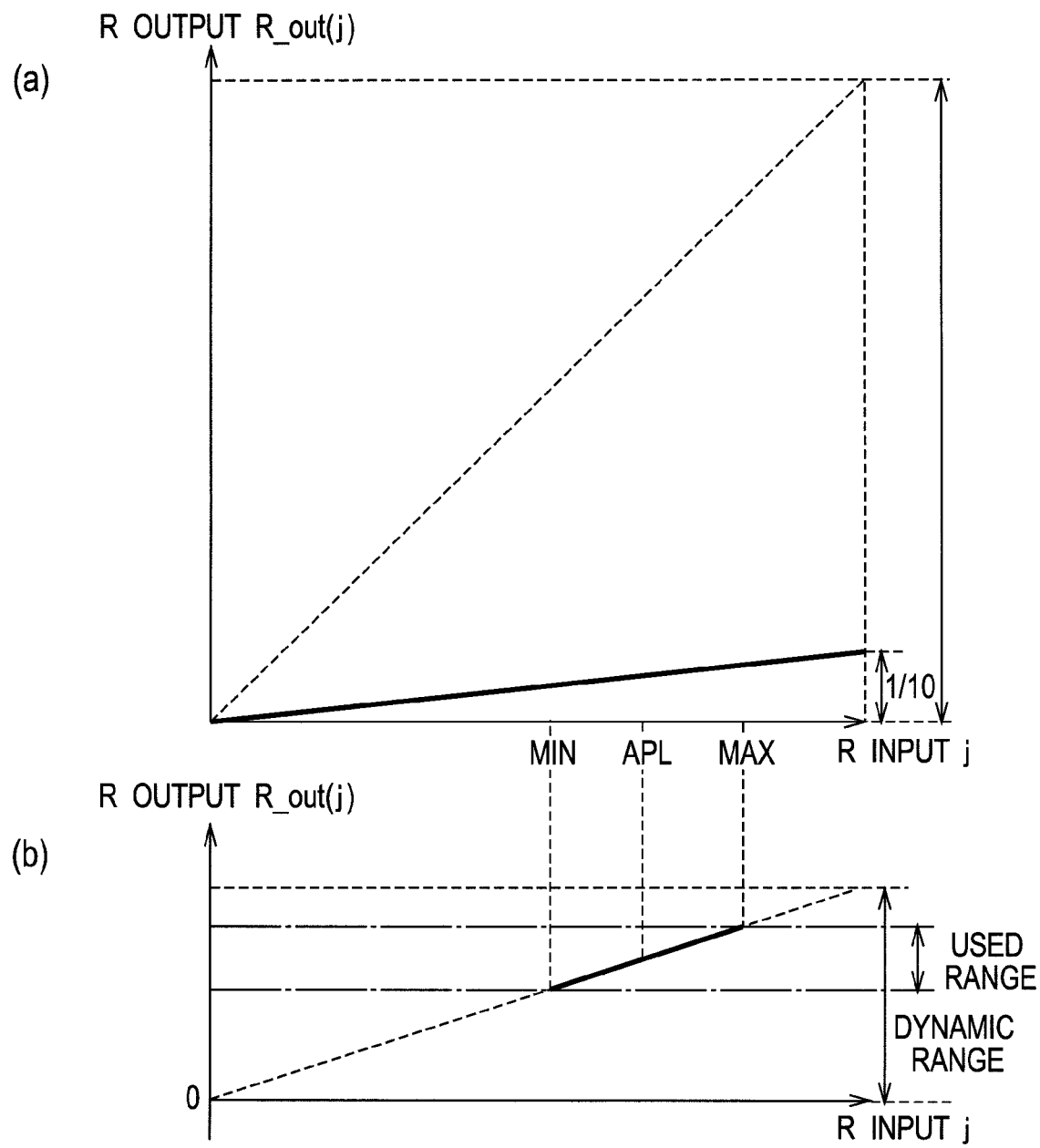
FIG. 1 is an explanatory view of a problem with the conventional pseudo-stereo image generating device.
Figure 2:
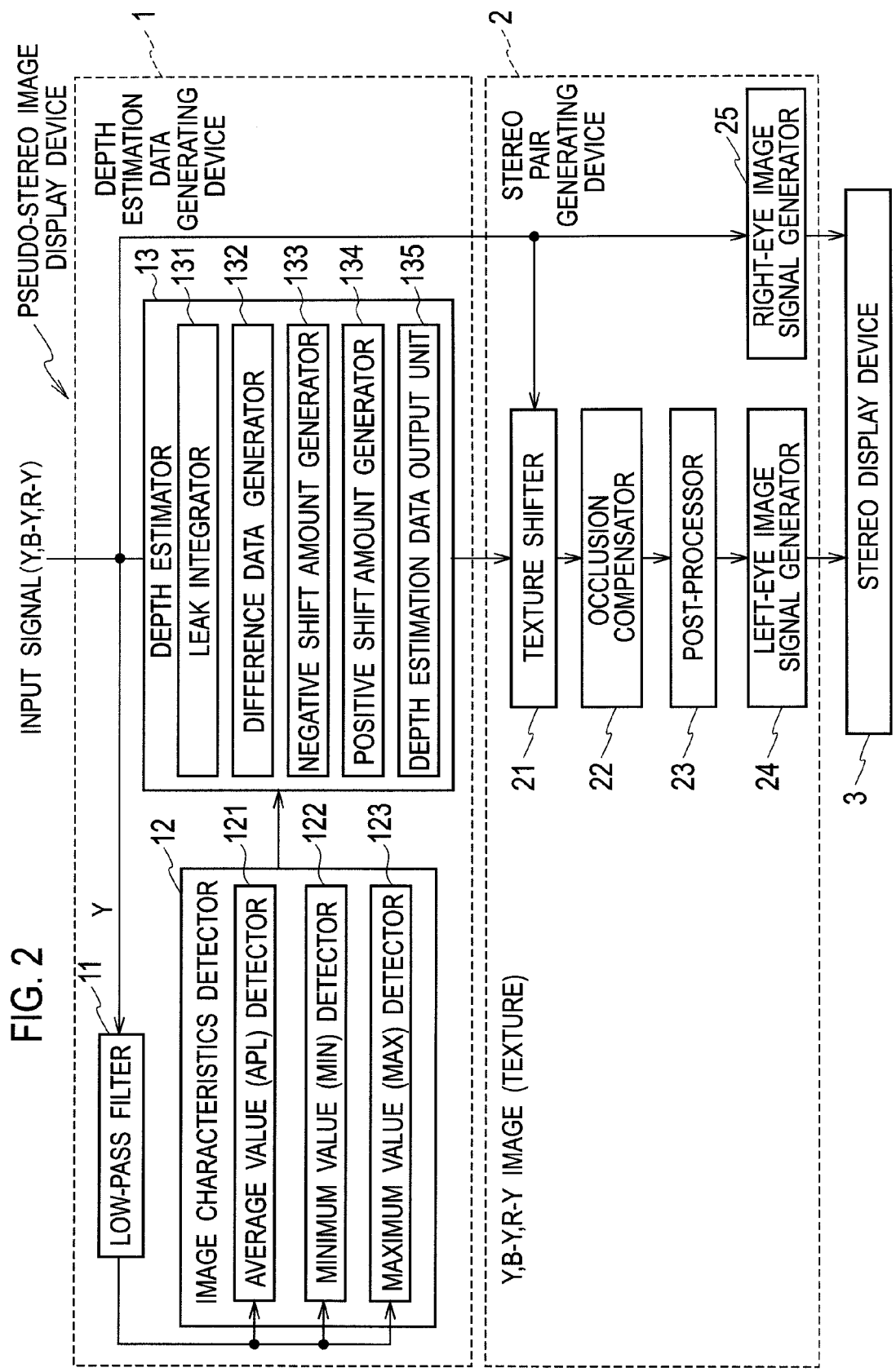
FIG. 2 is a block diagram illustrating a configuration of a pseudo-stereo image display device according to an embodiment of the present invention.

An embodiment of the present invention will be explained below, referring to the drawings. FIG. 2 is a block diagram illustrating a configuration of a pseudo-stereo image display device according to the present embodiment.

As shown in FIG. 2, the pseudo-stereo image display device according to the present embodiment, including a depth estimation data generating device 1, a stereo pair generating device 2, and a stereo display device 3, is configured to generate a left-eye image signal and a right-eye image signal from video signals (brightness signal Y, color-difference signals B-Y and R-Y) of a non-stereo image formed by a plurality of temporally successive images which are not provided with depth information explicitly or even implicitly, as with stereo images, and display a pseudo-stereo image using the left-eye image signal and the right-eye image signal on the stereo display device 3.

In the following, the depth estimation data generating device 1, the stereo pair generating device 2, and the stereo display device 3 constituting the pseudo-stereo image display device will be respectively explained.

(Configuration of Depth Estimation Data Generating Device)

As shown in FIG. 2, the depth estimation data generating device 1 according to the present embodiment includes a low-pass filter 11 which removes influence of noise components, an image characteristics detector 12 which detects characteristics of an input non-stereo image and outputs image characteristics data, and a depth estimator 13 which generates depth estimation data. The low-pass filter 11 is not essential and may be omitted.

Here, the image characteristics detector 12 has an average value detector 121 which detects the average brightness of the brightness signal components of a non-stereo image to generate average value (APL) data, a minimum value detector 122 which detects a minimum brightness of brightness signal components of the non-stereo image to generate minimum value (MIN) data, and a maximum value detector 123 which detects a maximum brightness of brightness signal components of the non-stereo image to generate maximum value (MAX) data.

Figure 3:
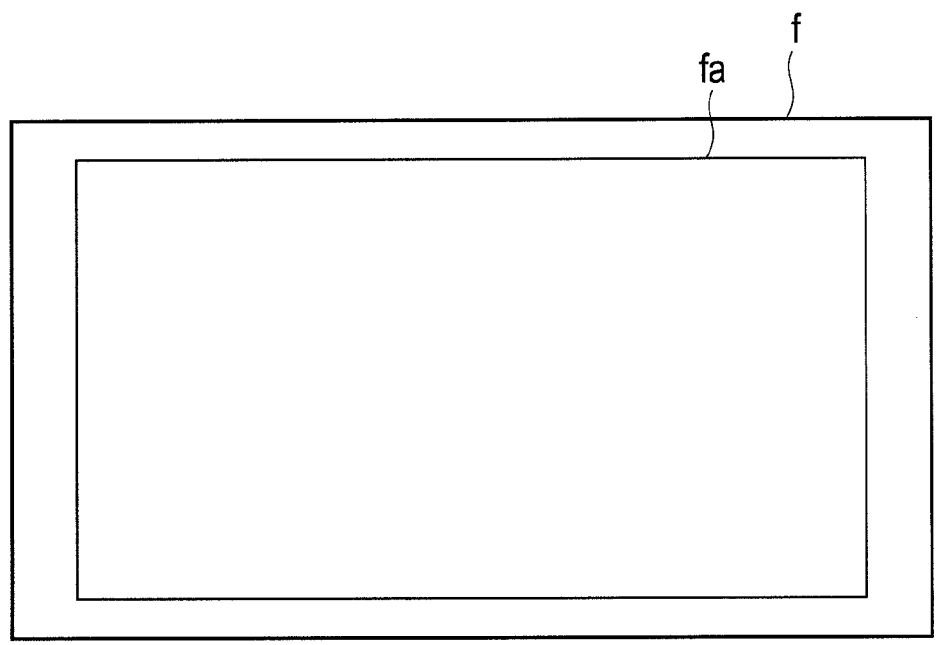
FIG. 3 illustrates an example of a determination region in a screen of an image input to the pseudo-stereo image display device according to the embodiment of the present invention.

FIG. 3 illustrates an example of a determination region fa provided in a screen f of an input non-stereo image. As shown in FIG. 3, the image characteristics detector 12 provides the predetermined determination region fa in the screen f which is a field or a frame, and generates average value data, minimum value data, and maximum value data, as the image characteristics data, based on the brightness level in the determination region fa.

Although the image characteristics data is generated for each field or frame in the present embodiment, the image characteristics data may be generated for each plurality of fields or frames, in which case it suffices to generate the image characteristics data for each predetermined unit (time unit) of screens. However, it is preferred to generate the image characteristics data for each field or frame. Furthermore, the determination region fa may be of any size provided that it is within an effective video period.

The depth estimator 13 has a leak integrator 131 which performs leak integration on the image characteristics data, a difference data generator 132 which calculates the difference between the brightness signal components of a non-stereo image and the average value data to generate difference data, a negative shift amount generator 133 which compensates, using the minimum value data, a value of the difference data which is smaller than zero in association with the lower limit of the dynamic range to generate a negative shift amount, a positive shift amount generator 134 which compensates, using the maximum value data, a value of the difference data which is larger than zero in association with the upper limit of the dynamic range to generate a positive shift amount, and a depth estimation data output unit 135 which outputs the negative shift amount and the positive shift amount as depth estimation data. The depth estimation data is data for generating a pseudo-stereo image from an image which is not provided with depth information (also referred to as a non-stereo image).

Figure 4:
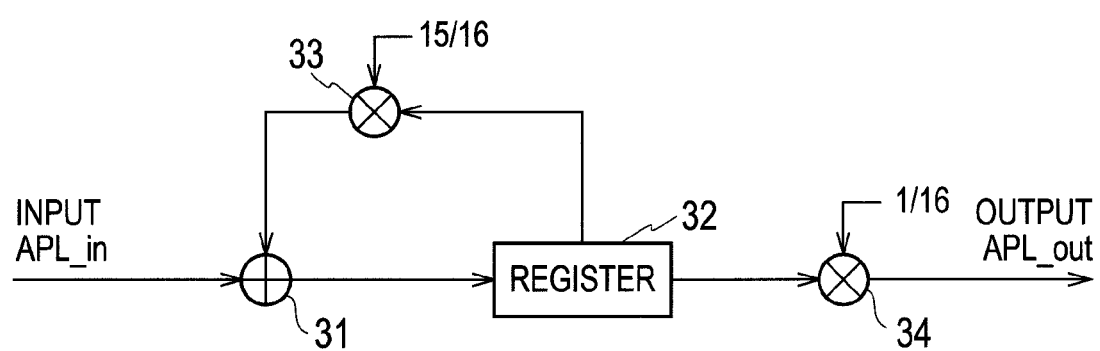
FIG. 4 is a block diagram illustrating the configuration of a leak integrator of a depth estimation data generating device according to the embodiment of the present invention.

Here, a circuit configuration of the leak integrator 131 will be explained, referring to FIG. 4. As shown in FIG. 4, the leak integrator 131 has an adder 31, a register 32, and multipliers 33 and 34. When average value data, minimum value data, and maximum value data which are the image characteristics data are input from the image characteristics detector 12, a leak integration process is performed. It is noted, in FIG. 4, a case where the average value data is input is explained as an example.

As shown in FIG. 4, when input average value data APL_in is input, the adder 31 adds to the input average value data APL_in a value calculated by multiplying, in the multiplier 33, the data output from the register 32 by 15/16. The value added by the adder 31 is stored in the register 32 and will be used by the multiplier 33 and the adder 31 as described above when an input average value data APL_in in the next field or frame is input. Next, the data output from the register 32 is multiplied by 1/16 in the multiplier 34, and output average value data APL_out, which is the final output data, is output.

As thus described, by performing the leak integration process in the leak integrator 131, the image is gradually changed so that a more natural image quality can be provided.

(Procedure of Generation Process of Depth Estimation Data)

Next, a procedure of a generation process of depth estimation data by the depth estimation data generating device according to the present embodiment will be explained, referring to the flow chart of FIG. 5.

Figure 5:
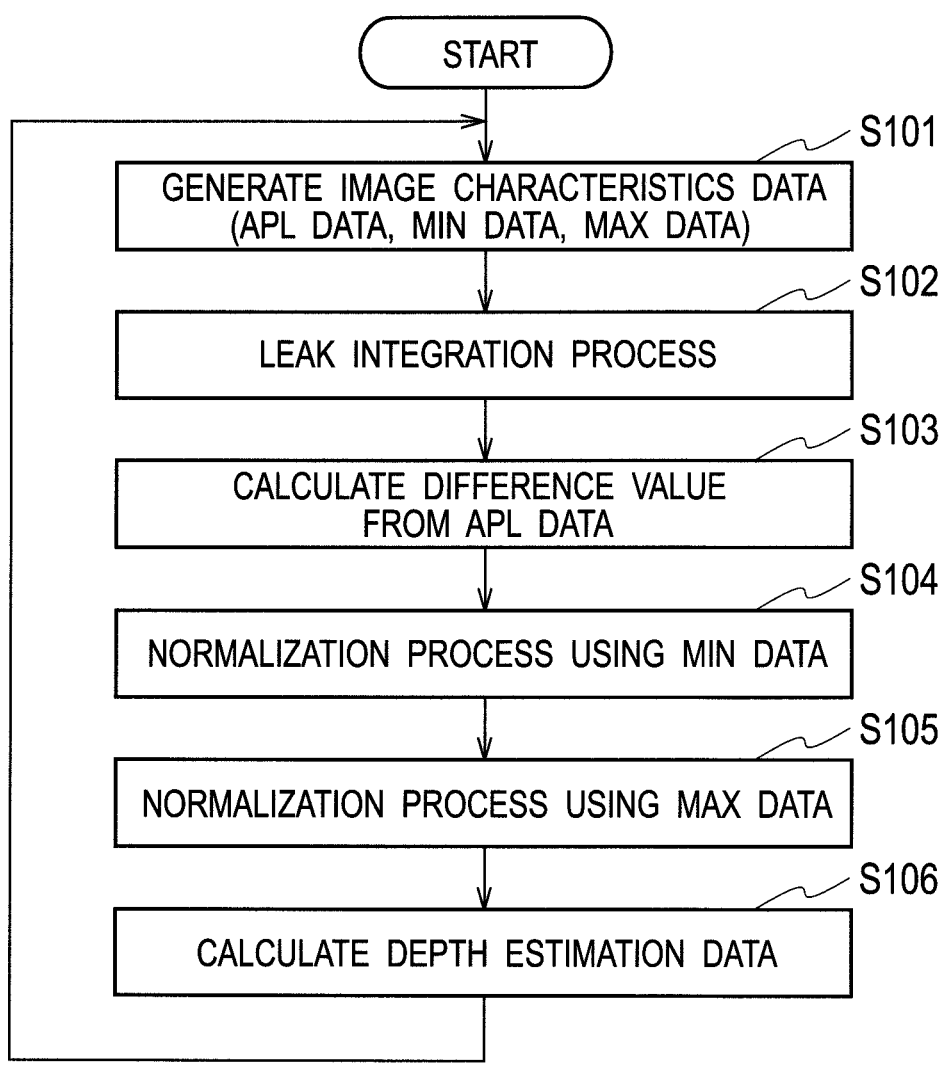
FIG. 5 is a flow chart illustrating the processing procedure of generating depth estimation data by the depth estimation data generating device according to the embodiment of the present invention.

As shown in FIG. 5, at step S101, the image characteristics detector 12 detects the average brightness, the minimum brightness, and the maximum brightness from the brightness signal component of the input video signal from which noise has been removed by the low-pass filter 11, and generates image characteristics data. The image characteristics data includes the average value data APL indicating the average brightness, the minimum value data MIN indicating the minimum brightness, and maximum value data MAX indicating the maximum brightness. The leak integrator 131 then performs a leak integration process in a temporal direction on the image characteristics data at step S102.

Next, at step S103, the difference data generator 132 calculates the difference between the brightness signal components and the average value data APL of the input video signal according to formula (1) and generates difference data.

$$Y\_sub(j) = j - APL \quad (1)$$

Here, $Y\_sub(j)$ is the difference data, $j$ is the brightness signal component of the input video signal, and APL is the average value data.

Based on the difference data $Y\_sub(j)$ generated in the difference data generator 132, the negative shift amount generator 133 performs a normalization process at step S104, using the minimum value data shown in formula (2).

If $Y\_sub(j) < 0$ $$S(j)^- = Y\_sub(j) \times LowLim / (MIN - APL) \quad (2)$$

Here, $S(j)^-$ is the negative shift amount, LowLim is the lower limit threshold, and MIN is the minimum value data.

The normalization process based on the minimum value data MIN compensates, using the minimum value data MIN, a value of the difference data $Y\_sub(j)$ which is smaller than zero in association with a predetermined lower limit of the dynamic range and generates the negative shift amount $S(j)^-$. In other words, if the difference data $Y\_sub(j)$ takes a value of (MIN−APL), the shift amount $S(j)$ (negative shift amount $S(j)^-$) of the brightness signal component having the minimum value data MIN is associated with the lower limit threshold LowLim. In addition, if the difference data $Y\_sub(j)$ takes a value which is larger than (MIN−APL) and smaller than zero, the shift amount $S(j)$ of the brightness signal component having data which is larger than the minimum value data MIN and smaller than the average value data APL is associated with a value which is larger than the lower limit threshold LowLim and smaller than zero.

Figure 6:
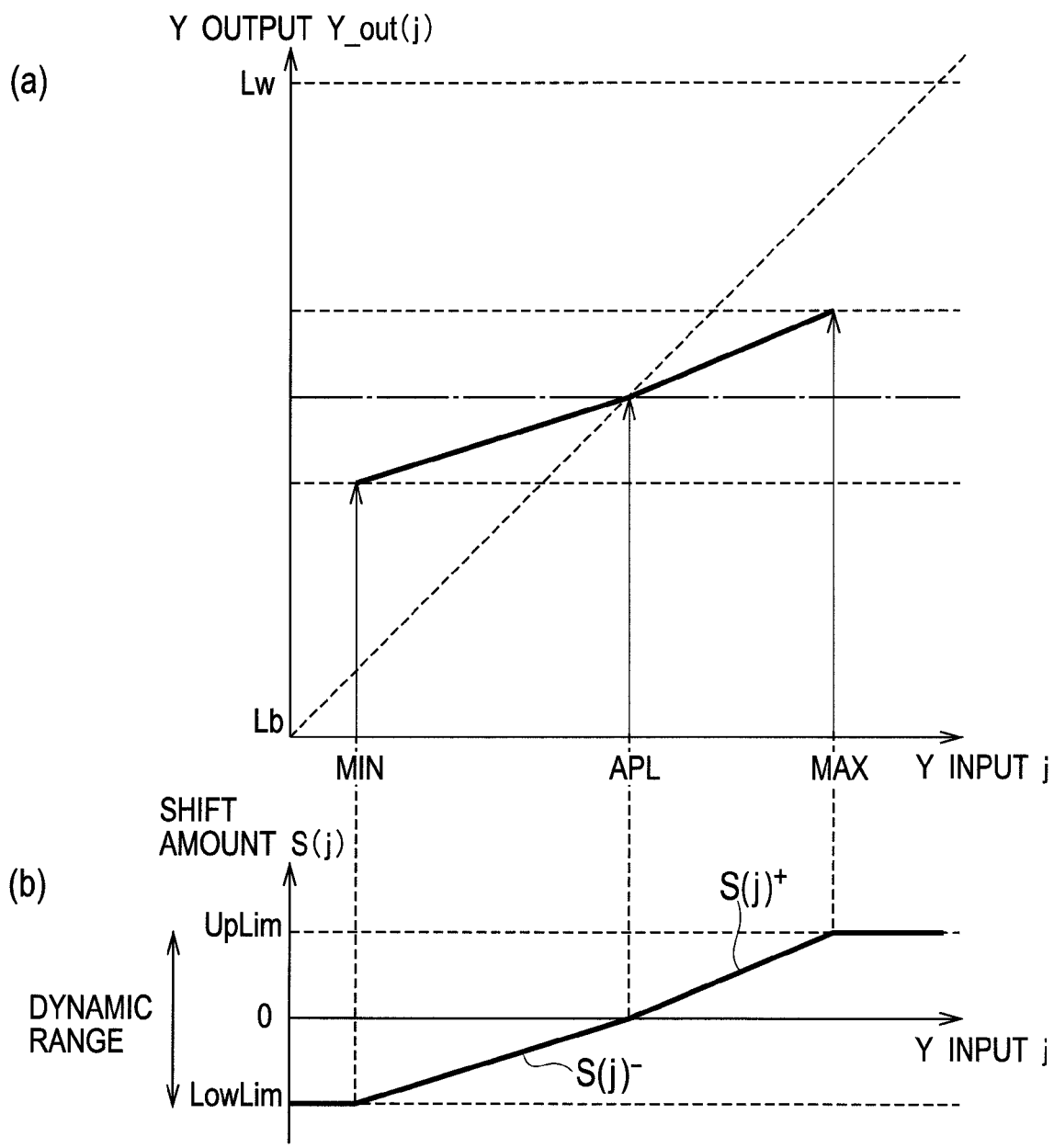
FIG. 6 illustrates an example of depth estimation data calculated by the depth estimation data generating device according to the embodiment of the present invention.

FIG. 6(a) shows the relation between the brightness signal components ($Y\_in(j)$) of the input video signal and the brightness signal components ($Y\_out(j)$) of the output video signal. For example, according to an explanation referring to FIG. 6(a), if the normalization process is performed to calculate the difference data $Y\_sub(j)$ when video signals (brightness signals) having the average brightness APL, the minimum brightness MIN, and the maximum brightness MAX are input, the values ranging from MIN to APL shown in FIG. 6(b) correspond to the negative shift amount $S(j)^-$.

As shown in FIG. 6(b), the negative shift amount $S(j)^-$ becomes zero if the input brightness signal $j$ has a brightness value corresponding to the average value data APL, and the negative shift amount $S(j)^-$ becomes the lower limit threshold LowLim if the input brightness signal $j$ has a brightness value corresponding to the minimum value data MIN. Therefore, the negative shift amount $S(j)^-$ can be expanded to the lower limit of the dynamic range by preliminarily setting the lower limit threshold LowLim to the lower limit of the dynamic range.

In comparison with the conventional technique, since the shift amount when the input brightness signal $j$ is the minimum brightness MIN does not necessarily become the lower limit of the dynamic range according to the conventional method which does not perform normalization, the entire dynamic range cannot be utilized. However, since the present embodiment performs normalization and thus the negative shift amount S(j)⁻ becomes the lower limit threshold LowLim when the input brightness signal j is the minimum brightness MIN, as shown in FIG. 6(b), the entire dynamic range can be sufficiently utilized by preliminarily setting the lower limit threshold LowLim to the lower limit of the dynamic range.

Next, the positive shift amount generator 134 performs a normalization process at step S105 based on the maximum value data shown in formula (3).

If $Y\_sub(j) > 0$ $$S(j)^+ = Y\_sub(j) \times UpLim/(MAX-APL) \quad (3)$$

Here, $S(j)^+$ is the positive shift amount, UpLim is the upper limit threshold, and MAX is the maximum value data.

The normalization process based on the maximum value data MAX compensates, using the maximum value data MAX, a value of the difference data $Y\_sub(j)$ which is larger than zero in association with a predetermined upper limit of the dynamic range and generates the positive shift amount $S(j)^+$. By performing the normalization process to calculate the difference data $Y\_sub(j)$ as described above, the values ranging from APL to MAX shown in FIG. 6(b) become the positive shift amount $S(j)^+$. In other words, if the difference data $Y\_sub(j)$ takes a value of (MAX−APL), the shift amount S(j) (positive shift amount $S(j)^+$) of the brightness signal component having the maximum value data MAX is associated with the upper limit threshold UpLim. In addition, if the difference data $Y\_sub(j)$ takes a value which is smaller than (MAX−APL) and larger than zero, the shift amount S(j) of the brightness signal component having data which is smaller than the maximum value data MAX and larger than the average value data APL is associated with a value which is smaller than the upper limit threshold UpLim and larger than zero.

As shown in FIG. 6(b), the positive shift amount $S(j)^+$ becomes zero if the input brightness signal j has a brightness value corresponding to the average value data APL, and the positive shift amount $S(j)^+$ becomes the upper limit threshold UpLim if the input brightness signal j has a brightness value corresponding to the maximum value data MAX. Therefore, the positive shift amount $S(j)^+$ can be expanded to the upper limit of the dynamic range by preliminarily setting the upper limit threshold UpLim to the upper limit of the dynamic range.

In comparison with the conventional technique, since the shift amount when the input brightness signal j is the maximum brightness MAX does not necessarily become the upper limit of the dynamic range according to the conventional method which does not perform normalization, the entire dynamic range cannot be utilized. However, since the present embodiment performs normalization and thus the positive shift amount $S(j)^+$ becomes the upper limit threshold UpLim when the input brightness signal j is the maximum brightness MAX, as shown in FIG. 6(b), the entire dynamic range can be sufficiently utilized by preliminarily setting the upper limit threshold UpLim to the upper limit of the dynamic range.

After the negative shift amount $S(j)^-$ and positive shift amount $S(j)^+$ are generated, the depth estimation data output unit 135 subsequently calculates the shift amount S(j) shown in formula (4) at step S106, and outputs the shift amount S(j) as the depth estimation data.

$$S(j) = S(j)^- + S(j)^+ \quad (4)$$

The positive shift amount $S(j)^+$ acts in a projecting (convex) direction, whereas the negative shift amount $S(j)^-$ acts in a withdrawing (concave) direction. The factor determining the characteristics can be attributed to the fact that the white color with a high brightness is an expansive color visible as widely spreading, whereas the black color with a low brightness is a contracting color visible as shrinking.

Next, an example of generating depth estimation data when distribution of the input brightness signals varies in many ways will be explained, referring to FIGS. 7 to 9.

Figure 7:
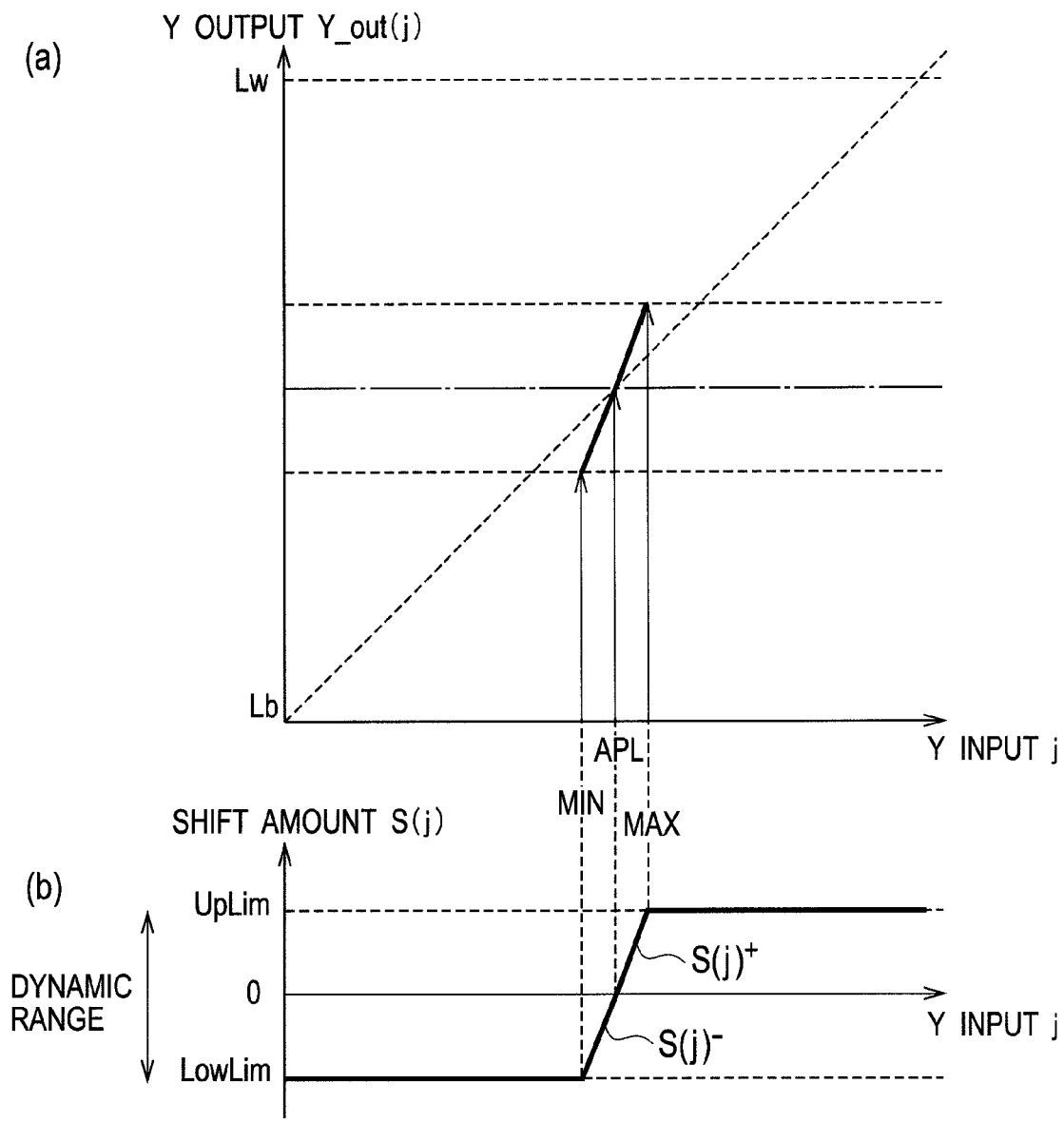
FIG. 7 illustrates an example of depth estimation data calculated by the depth estimation data generating device according to the embodiment of the present invention.

FIG. 7 shows a case where depth estimation data (shift amount S) is generated for an image having the data of the brightness signal j concentrating on an intermediate brightness. As shown in FIG. 7(a), although the brightness signal components of the input video signal concentrate on a narrow range (MAX−MIN), the range expands as shown in FIG. 7(b) by performing the normalization process, with the dynamic range in the depth estimation data being utilized to a maximum extent from the lower limit threshold LowLim to the upper limit threshold UpLim.

Figure 8:
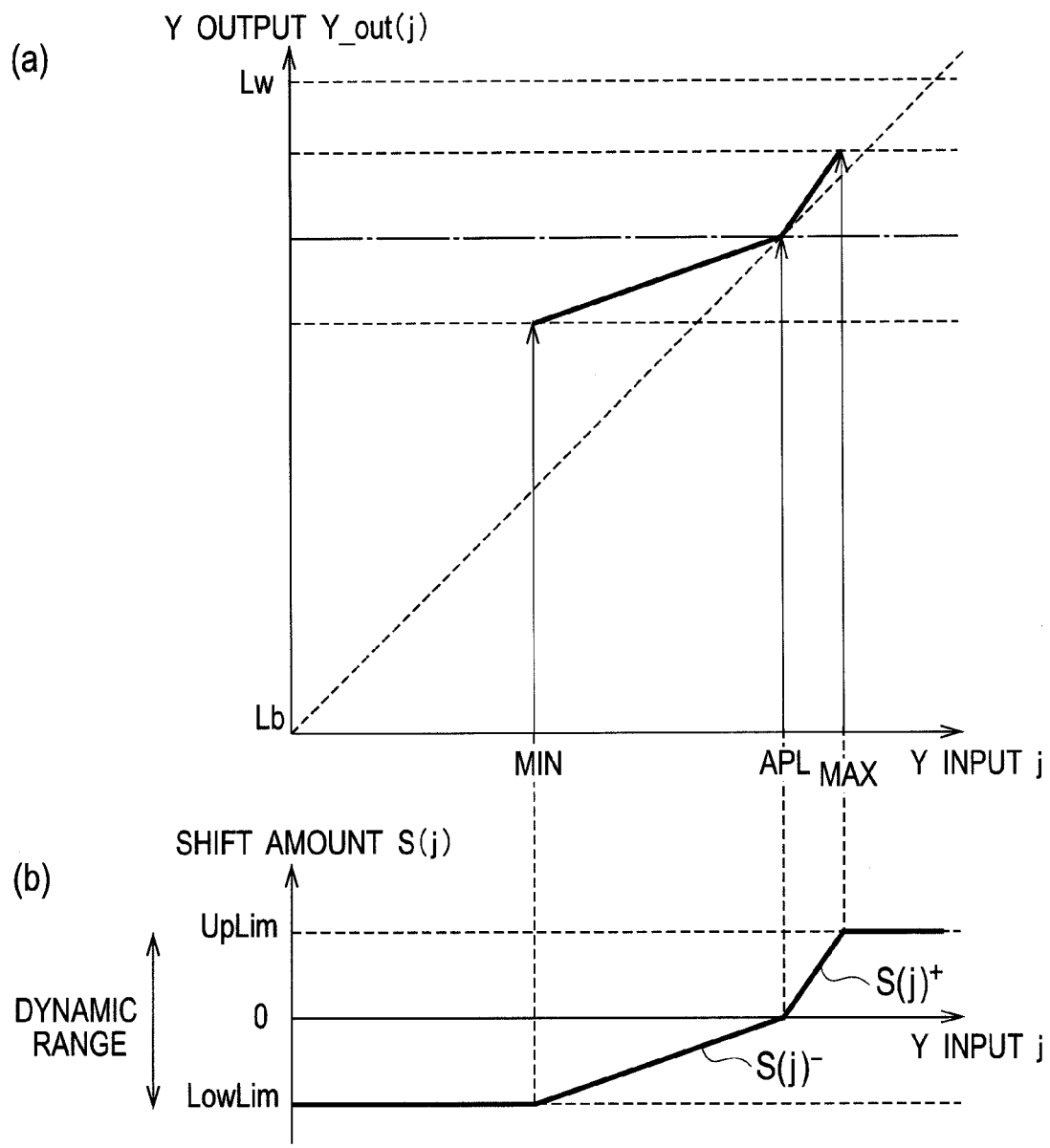
FIG. 8 illustrates an example of depth estimation data calculated by the depth estimation data generating device according to the embodiment of the present invention.

FIG. 8 shows a case where the depth estimation data (shift amount S) is generated for an image having data of the brightness signal j mainly distributed in a high brightness region. As shown in FIG. 8(a), since the level of APL having the average brightness data APL detected with a large amount of image information included therein is used as the reference point, conversion to the depth estimation data shown in FIG. 8(b) preserving the necessary information included mainly in the high brightness region.

Figure 9:
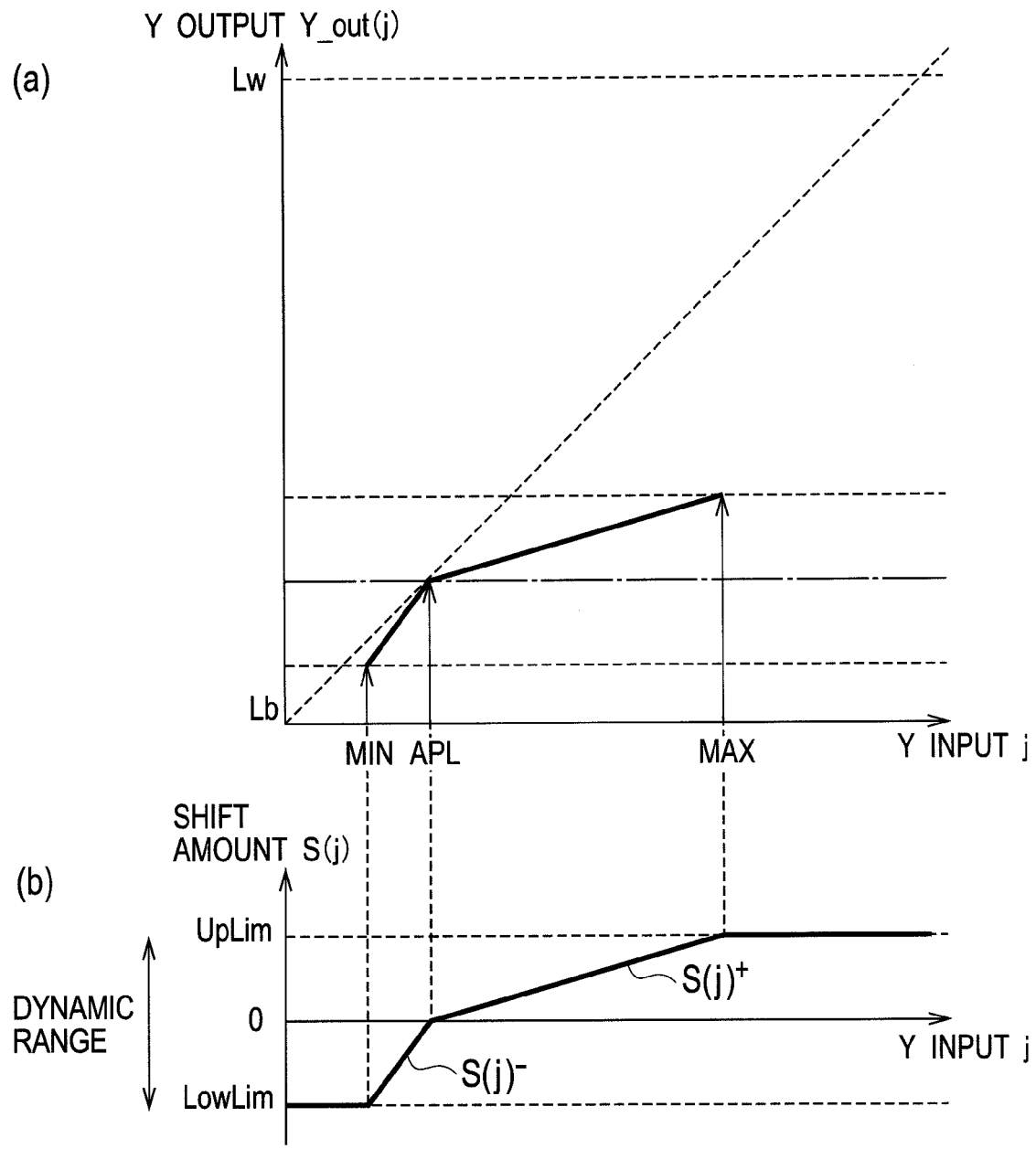
FIG. 9 illustrates an example of depth estimation data calculated by the depth estimation data generating device according to the embodiment of the present invention.

FIG. 9 shows a case where the depth estimation data (shift amount S) is generated for an image having data of the brightness signal j mainly distributed in a low brightness region. As shown in FIG. 9(a), since the level of APL having the average brightness data APL detected with a large amount of image information included therein is used as the reference point, conversion to the depth estimation data shown in FIG. 9(b) preserving the necessary information included mainly in the low brightness region. Accordingly, an effect of improving the feeling of depth can be obtained.

When the process of step S106 is completed as described above, the process flow subsequently returns to step S101 and the processes up to step S106 are repeated. When the depth estimation data is generated for all the input video signals, the process of generating the depth estimation data by the depth estimation data generating device 1 according to the present embodiment is completed.

(Effect of Depth Estimation Data Generating Device)

Next, an effect of the depth estimation data generating device according to the present embodiment will be explained, referring to FIG. 10.

A case where an overall bright image of sky has been input as an input image as shown in FIG. 10(a) will be explained. In the image characteristics data of the input image, as shown in FIG. 10(b), the brightness value corresponding to the average value data APL is 175, the brightness value corresponding to the minimum value data MIN is 131, and the brightness value corresponding to the maximum value data MAX is 242, indicating that image pixels are concentrated in the overall bright (high-brightness) region as can be seen, referring to the appearance frequency of pixels indicated along the vertical axis.

Here, the image which has been subject to the conventional shift process is shown in FIG. 10(c). The image is expressed in gray scale, in which the range from black to white is displayed in 256 steps assuming that the black side has shifted in the withdrawing (concave) direction and the white side has shifted in the projecting (convex) direction. In FIG. 10(d), the horizontal axis expresses the shift amount and the vertical axis expresses the appearance frequency of pixels, with the dynamic range assumed to be in a range of −24 to +23 apart from the center of 128 (104 to 151). As shown in FIG. 10(d), only the shift amount in a narrow range of 128 to 149 is used and thus the output image has a weak stereo effect with a small difference of contrast as can be seen in FIG. 10(c).

On the other hand, the image which has been subject to the shift process according to the present invention shown in FIG. 10(e) has successfully utilized most of the dynamic range (104 to 151) as shown in FIG. 10(f). Therefore, the image shown in FIG. 10(e) is an output image having a sufficient stereo effect with a large difference of contrast, in other words a large parallax. As thus described, with the depth estimation data generating device 1 according to the present embodiment, a sufficient pseudo-stereo effect can be obtained, utilizing the dynamic range to a maximum extent.

(Configuration of Stereo Pair Generating Device and Stereo Display Device)

When the depth estimation data is generated by the depth estimation data generating device 1 as described above, it becomes possible to generate an image from a different-viewpoint based on the depth estimation data. Here, the configuration of the stereo pair generating device 2 and the stereo display device 3 according to the present embodiment will be explained, referring to FIG. 2.

As shown in FIG. 2, the stereo pair generating device 2 includes a texture shifter 21 which shifts the texture of video signals of the non-stereo image input based on the depth estimation data generated by the depth estimator 13, an occlusion compensator 22 which compensates occlusion, a post-processor 23 which performs post-processing, a left-eye image signal generator 24, and a right-eye image signal generator 25.

The left-eye image signal and the right-eye image signal generated by the stereo pair generating device 2 are then input to the stereo display device 3 and displayed as a pseudo stereo image by the stereo display device 3.

(An Example Operation of Stereo Pair Generating Device 2)

The stereo pair generating device 2 generates an image from a different-viewpoint based on the video signal and the depth signal having been estimated on the basis of a gradation compensation curve generated by the depth estimation data generating device 1. For example, when shifting the viewpoint to the left, the closer an object displayed in front of the screen to the viewer is, the more inward (nose side) it is visible to the viewer, and thus the texture of the corresponding part is shifted inward, i.e., to the right, by an amount according to the depth. On the contrary, the closer an object displayed in back of the screen to the viewer is, the more outward it is visible to the viewer, and thus the texture of the corresponding part is shifted to the left by an amount according to the depth. Using this image as the left-eye image and the original image as the right-eye image, a stereo pair is produced.

Specifically, in the stereo pair generating device 2 of the present embodiment shown in FIG. 2, the texture shifter 21 first shifts, sequentially in ascending order of values of the depth estimation data which has been output from the depth estimator 13 of the depth estimation data generating device 1, i.e., starting from the parts located further back, textures of the video signals of the parts corresponding to the values, to the right, for example, by the number of pixels of the shift amount S indicated by the depth signal. If the depth signals are negative, the textures are shifted to the left by the number of pixels of the shift amount S indicated by the depth signal.

The shift operation of textures of video signals by texture shifter 21 based on the shift amount S corresponds to the shift of textures of video signals of a non-stereo image. In the other words, it is a process of shifting each pixel of a non-stereo image to the right or left according to the value of the shift amount S, which is the value of the depth estimation data.

Now, there is a case that a part without any texture, i.e., occlusion arises due to variation of the positional relation in the image by performing the shift. Such a part is either filled with video signals around the corresponding part of the video signal by the occlusion compensator 22, or filled by a method described in known documents (Kunio Yamada, Kenji Mochizuki, Kiyoharu Aizawa, Takahiro Saito: "Disocclusion Based on the Texture Statistics of the Image Segmented by the Region Competition Algorithm", The Institute of Image information and Television Engineers Journal, Vol. 56, No. 5, pp. 863-866 (2002.5)).

An image which has been disoccluded by the occlusion compensator 22 is subject to post-processing such as smoothing by the post-processor 23 to reduce the noises which has occurred in previous processes, and output as a left-eye image signal by the left-eye image signal generator 24. On the other hand, the right-eye image signal generator 25 outputs the video signal as a right-eye image signal.

In this manner, the stereo pair generating device 2 can generate a stereo pair of a left-eye image signal and a right-eye image signal based on the depth estimation data estimated on the basis of a gradation compensation curve generated by the depth estimation data generating device 1, and the video signal. The left-eye image signal and the right-eye image signal are then output to the stereo display device 3. It then becomes possible for the stereo display device 3 to display a pseudo-stereo image with an improved pseudo-stereoscopic effect all over the screen by the stereo pair.

As for the stereo pair, a stereo pair may be produced by reversing the right and left, with the left-eye image signal being the original image and the right-eye image signal being the different-viewpoint image. Additionally, in the processing described above, although the stereo pair is produced with one of the right-eye image signal and the left-eye image signal being the video signal and the other being the generated different-viewpoint image signal, it is also possible to produce a stereo pair using different-viewpoint image signals for both the right and the left eyes, in other words, using a different-viewpoint image signal which has been shifted to the right and a different-viewpoint image signal which has been shifted to the left.

(Example Operation of Stereo Display Device 3)

The stereo display device 3 according to the present embodiment shown in FIG. 2, which is for example a projection system using polarized glasses, a projection system or a display system combining time-sharing display and liquid crystal shutter glasses, a lenticular-type stereo display, an anaglyph-type stereo display, a head-mount display, or a projector system using two projectors corresponding to each one of stereo images, receives an input of the left-eye image signal and the right-eye image signal generated by the stereo pair generating device 2 and displays a pseudo-stereo image on the display or the like.

In the explanation of the embodiment described above, although an example with two viewpoints, namely, the left-eye image signal and the right-eye image signal has been provided as the stereo pair generating device 2, the present invention is not limited thereto. In other words, it is needless to say that, when displaying on a display device capable of displaying two or more viewpoints, different-viewpoint images as many as the number of viewpoints are generated.

In addition, it is also possible to construct a multi-viewpoint stereo image display system using a display device capable of displaying two or more viewpoints as described above. In the present display system, an embodiment equipped with audio output may also be considered. In this case, for image contents not having audio information such as still images, an embodiment having environment sound suited for the image added thereto can be considered.

Additionally, in the present embodiment, although a case has been explained where the depth estimation data generating device 1, the stereo pair generating device 2, and the stereo display device 3 are implemented by hardware as shown in FIG. 2, the present invention is not limited to those implemented by hardware, and it is needless to say that the functions of the depth estimation data generating device 1, the stereo pair generating device 2, and the stereo display device 3 may be realized, for example, by a CPU and software of a computer program for operating the CPU. In this case, the computer program may be loaded to the computer from a recording medium, or may be loaded to the computer via a network.

Although the present invention has been described above referring to an embodiment, the above embodiment is merely for illustrating a device and a method for realizing the technical idea of the present invention, and the technical idea of the invention does not specify material, shape, structure, or arrangement of the components. Various modifications can be made to the technical idea of the invention within the scope of accompanying claims.

What is claimed is:

1. A depth estimation data generating device comprising:
    an average value detector which detects an average brightness of brightness signal components of an image to generate average value data;
    a minimum value detector which detects a minimum brightness of the brightness signal components of the image to generate minimum value data;
    a maximum value detector which detects a maximum brightness of the brightness signal components of the image to generate maximum value data;
    a difference data generator which calculates a difference between the brightness signal components of the image and the average value data to generate difference data;
    a negative shift amount generator which generates a negative shift amount in a manner such that the difference data, which has a value smaller than zero, is subject to a normalization process according to a first equation in which the average value data is transformed into zero and the minimum value data is transformed into a lower limit threshold of the negative shift amount acting in a withdrawing direction;
    a positive shift amount generator which generates a positive shift amount in a manner such that the difference data, which has a value larger than zero, is subject to a normalization process according to a second equation in which the average value data is transformed into zero and the maximum value data is transformed into an upper limit threshold of the positive shift amount acting in a projecting direction; and
    a depth estimation data output unit which outputs the negative shift amount and the positive shift amount as depth estimation data for generating a pseudo-stereo image from the image.

2. A nontransitory physical computer-readable recording medium having recorded thereon a depth estimation data generating program causing a computer to execute:
    an average value detecting step of detecting an average brightness of brightness signal components of an image to generate average value data;
    a minimum value detecting step of detecting a minimum brightness of the brightness signal components of the image to generate minimum value data;
    a maximum value detecting step of detecting a maximum brightness of the brightness signal components of the image to generate maximum value data;
    a difference data generating step of calculating a difference between the brightness signal components of the image and the average value data to generate difference data;
    a negative shift amount generating step of generating a negative shift amount in a manner such that the difference data, which has a value smaller than zero, is subject to a normalization process according to a first equation in which the average value data is transformed into zero and the minimum value data is transformed into a lower limit threshold of the negative shift amount acting in a withdrawing direction;
    a positive shift amount generating step of generating a positive shift amount in a manner such that the difference data, which has a value larger than zero, is subject to a normalization process according to a second equation in which the average value data is transformed into zero and the maximum value data is transformed into an upper limit threshold of the positive shift amount acting in a projecting direction; and
    a depth estimation data output step of outputting the negative shift amount and the positive shift amount as depth estimation data for generating a pseudo-stereo image from the image.

3. A pseudo-stereo image display device for generating and displaying a pseudo-stereo image from a non-stereo image which is not provided with depth information explicitly or even implicitly, as with a stereo image, the display device comprising:
    a depth estimation data generating device which generates the depth estimation data;
    the depth estimation data generating device including:
        an average value detector which detects an average brightness of brightness signal components of an image to generate average value data;
        a minimum value detector which detects a minimum brightness of the brightness signal components of the image to generate minimum value data;
        a maximum value detector which detects a maximum brightness of the brightness signal components of the image to generate maximum value data;
        a difference data generator which calculates a difference between the brightness signal components of the image and the average value data to generate difference data:
        a negative shift amount generator which generates a negative shift amount in a manner such that the difference data, which has a value smaller than zero, is subject to a normalization process according to a first equation in which the average value data is transformed into zero and the minimum value data is transformed into a lower limit threshold of the negative shift amount acting in a withdrawing direction;
        a positive shift amount generator which generates a positive shift amount in a manner such that the difference data, which has a value larger than zero, is subject to a normalization process according to a second equation in which the average value data is transformed into zero and the maximum value data is transformed into an upper limit threshold of the positive shift amount acting in a projecting direction; and a depth estimation data output unit which outputs the negative shift amount and the positive shift amount as depth estimation data for generating a pseudo-stereo image from the image;

a stereo pair generating device which generates a different-viewpoint image for displaying a pseudo-stereo image by shifting the texture of the non-stereo image by an amount in accordance with the depth of the corresponding part using the depth estimation data and the non-stereo image; and a stereo display device which displays the pseudo-stereo image using the different-viewpoint image and the non-stereo image.

\* \* \* \* \*